United States Patent Office 3,535,923
Patented Oct. 27, 1970

3,535,923
LOAD-SENSITIVE TRANSDUCER
Giovanni Martorana and Emilio Bossi, Milan, Italy, assignors to Società Applicazioni Gomma Antivibranti "Saga" S.p.A., Milan, Italy, an Italian joint-stock company
Filed July 9, 1968, Ser. No. 743,474
Claims priority, application Italy, Dec. 6, 1967, 23,591/67
Int. Cl. G01e 5/12
U.S. Cl. 73—141                        1 Claim

ABSTRACT OF THE DISCLOSURE

A load-sensitive transducer has a deformable member incorporating strain gauges and the applied load is transmitted to the diformable member through resilient bodies which distribute the load uniformly across the said member. The member is preferably pre-stressed in the direction of the load by shear induced in elastic material interposed rigid bodies which apply load to the deformable member.

---

This invention relates to load-sensitive transducers and is particularly concerned with such transducers capable of producing an indication of an applied dynamic or static load.

According to the present invention, a load-sensitive transducer comprises a deformable member interposed between two rigid load-receiving bodies and incorporating at least one load-sensing element capable of producing an indication of stress-induced deformation in the member resulting from a load applied thereacross by said rigid load-receiving bodies, at least one of which bodies transmits the applied load by way of a resilient means effective to distribute the load substantially uniformly over the cross-section of the deformable member so that the indication obtained from the sensing element or elements is substantially independent of the line of action of the load through the member.

The said resilient means for distributing the applied load may comprise a body of resilient material which is interposed between at least one of the load-receiving bodies and the deformable member.

The resilient means and the deformable member are preferably subjected to an axial pre-stress in the direction and sense of the applied load. One said body of resilient material, which conveniently is in the form of sheet material, may be interposed between each of the load-receiving bodies and the deformable member.

Suitably the/or each sensing element is an electric strain gauge of the kind well known in the art the resistance of which varies as a function of the stress-induced deformation in the deformable member. The strain gauge or gauges is or are connected in an electric circuit including a device effective to produce a visual or other indication of the change in resistance of the gauge and thereby, by visible calibration of the device, to produce a direct indication of the applied load.

In a preferred embodiment, the deformable member incorporates two or four strain gauges which are connectable with adjacent arms of a bridge circuit and which are conveniently arranged so that drift and transient changes in resistance do not produce spurious and erroneous indications of applied load.

The invention will now be described, by way of example, with reference to the accompanying drawings, in which.

Figure 1:
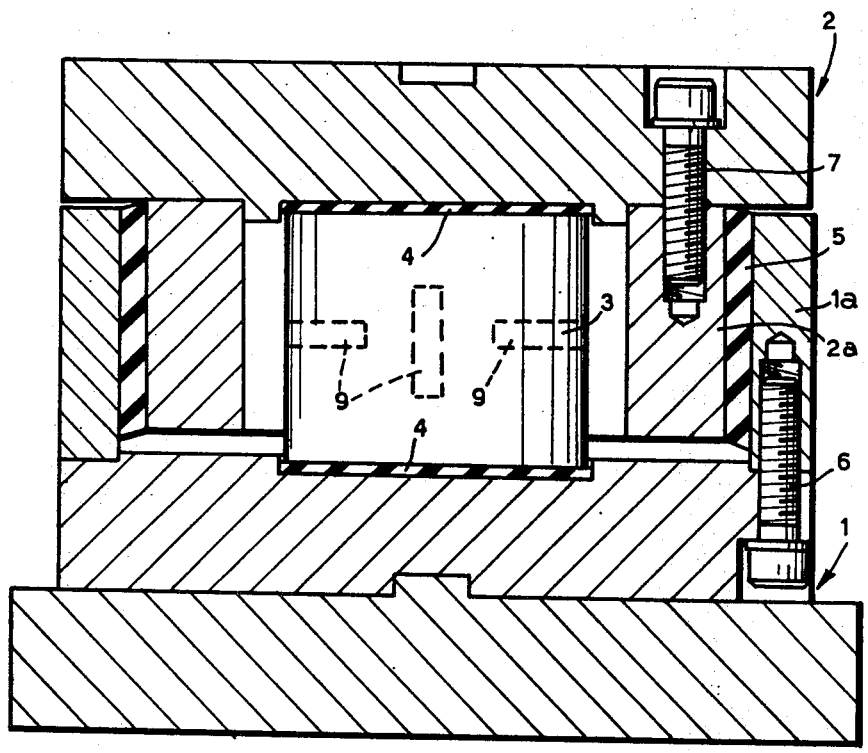
FIG. 1 is a sectional side view of a load-sensitive transducer according to one embodiment of the invention.

The electrical load-sensitive transducer illustrated in FIG. 1 comprises first and second substantially massive and rigid disc-like bodies 1 and 2 arranged coaxially and adapted to receive an applied axial load across their respective outer surfaces.

The first rigid body 1, which is of greater diameter than the second body 2, acts as a reaction member in operation of the transducer, so that a load for measurement can be applied to the second body 2 substantially in the direction of the common axis of the bodies 1 and 2.

Interposed between and coaxial with the rigid bodies 1 and 2 is a deformable cylindrical member 3 which is capable of elastic deformation when stressed by a substantially axial load applied across the bodies 1 and 2. Secured to or otherwise incorporated in the deformable member 3, are four electrical resistance strain gauges 9, (three of which are shown in broken lines) of the type well-known in the art which display a variation of resistance as a function of stress-induced deformation in the member 3.

The four strain gauges 9 are disposed in two parallel pairs, with the gauges of one pair being arranged parallel to and the gauges of the other pair being perpendicular to the direction (in this case axial) of the applied load. The strain gauges of each pair are connected in respective diametrically opposite arms of a bridge circuit including a meter or like device capable of producing an indication of the bridge out-of-balance current and therefore of the applied load. Such a bridge arrangement is effective to eliminate spurious readings and drift.

To ensure that the outputs from the strain gauges 9 are substantially independent of their spatial positions the member 3 a respective body of resilient material such as rubber is interposed between each end of the member 3 and the respective load-receiving body 1, 2.

When a load is applied across the bodies 1 and 2, the bodies 4 suffer elastic deformation, thereby uniformly distributing the applied load over the cross-section of the member 3. The action of the bodies 4 is analogous to that of a liquid film, and by distributing the stress uniformly across the member 3, the deformation of the latter is rendered free of bending and independent of the position relative to the axis of the transducer of the line of action of the applied load.

The bodies 4 are pre-stressed in the same direction and sense as the applied load by an arrangement including two interfitting tubular members 1a and 2a, each being co-axial with and of smaller axial extent than the member 3. An annular member 5 of rubber or other elastic material is located between the members 1a and 2a and is bonded, for example by vulcanisation, to the outer and inner surfaces of the members 2a, 1a respectively. The tubular member 2a is biased toward the body 2 by means of screws, one only of which is shown. The tubular member 1a is similarly biased toward the body 1 by means of screws 6. An internal pre-stress comprising an axially-directed shear is induced in the annular member 5 by tightening of the screws 6 and 7, as shown in FIG. 1. Such shear is effective to urge the bodies 1 and 2 together to pre-stress the bodies 4 compressively under no-load conditions and thereby substantially to avoid hysteresis effects in the resilient material of the bodies 4 under small values of the applied load.

The annular resilient member 5 is effective also to prevent relative radial displacement between the load-receiving bodies 1 and 2 ensuring correct positioning of the member 3.

The pre-stressing of the resilient material of the bodies 4 may be produced by alternative means to the sheared annular member 5. For example the members 1 and 2 may be urged together by metal springs or the like biassing the bodies 1 and 2 towards each other and compressing the member 3 therebetween.

Figure 2:
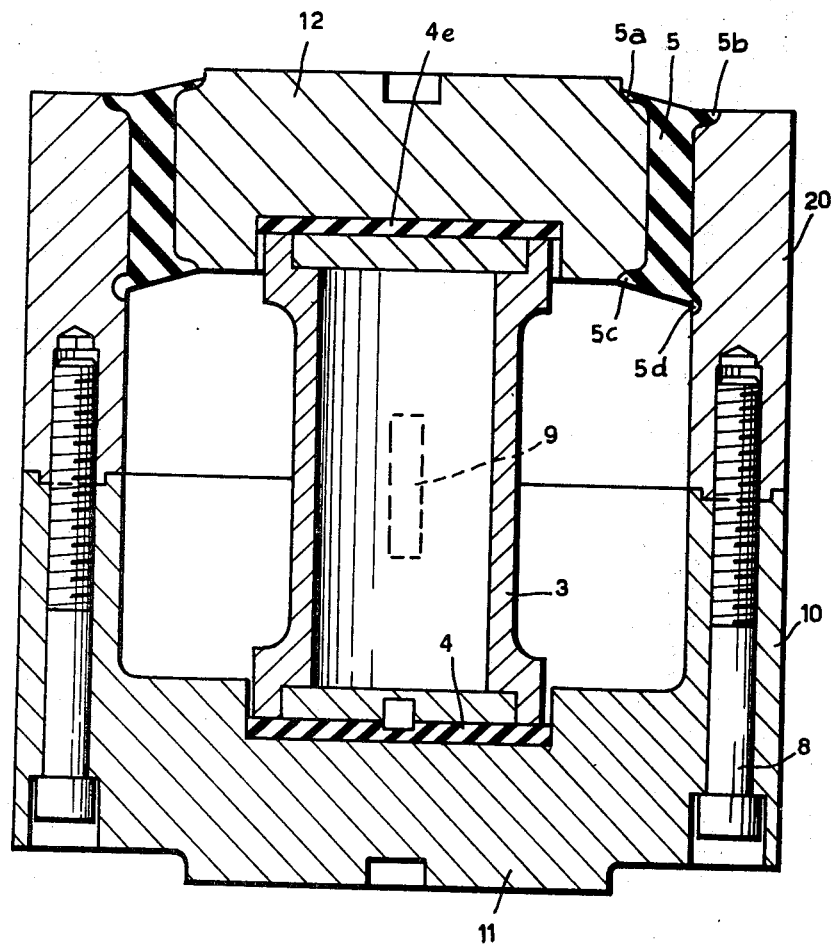
FIG. 2 is a sectional view of a transducer according to a further embodiment of the invention.

In the embodiment shown in FIG. 2, the first or lower load-receiving body is in the form of a bell-shaped member comprising a massive base portion 11 and a tubular skirt portion 10. The second or upper load-receiving body comprises a massive disc 12. The portion 11 and the disc 12 are separated from the deformable member 3 by respective bodies 4, 4a of resilient material, such as rubber. The deformable member 3 comprises in this case a hollow cylinder.

The bodies 4, 4a and the member 3 are pre-stressed as in the previous embodiment by means of axial shear pre-stressing produced in an annular resilient member 5, for example of rubber, which is suitably bonded to the outer edge surface of the disc 12 and to the inner surface of a tubular member 20 arranged to abut the end of the tubular skirt portion 10. The member 20 and the portion 10 may be drawn together by screws 8 to produce controlled axially-directed shear in the member 5 and thereby cause it to pre-stress the members 5 and 3. The resilient member 5 is provided with flanged ends which seat in co-operating annular grooves 5a, 5c and 5b, 5d in the disc 12 and in the member 20 respectively to assist in retaining the member 5 in position when subjected to said axially-directed shear stress.

Figure 3:
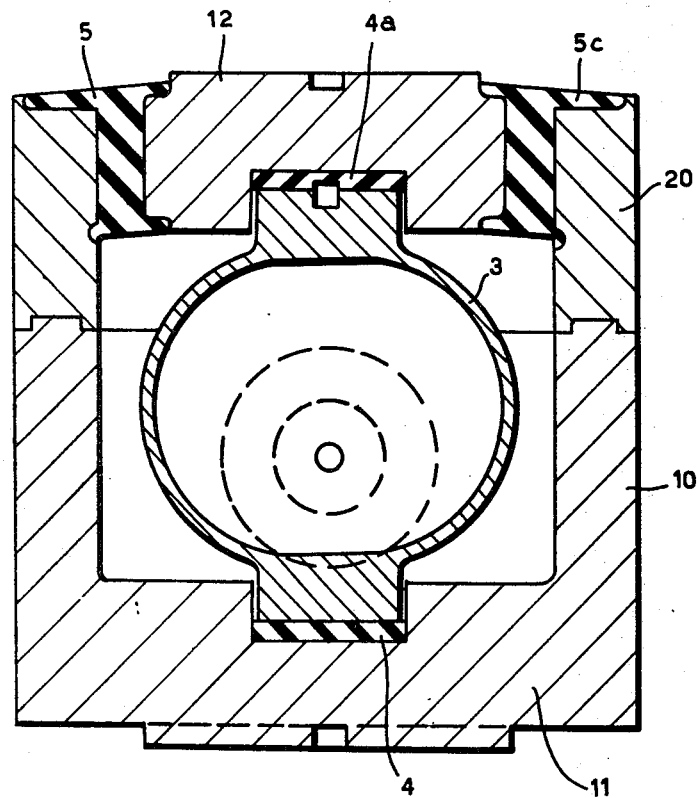
FIG. 3 is a sectional side view of a modification of the embodiment of FIG. 2.

In the embodiment of FIG. 3 the construction of the transducer is similar to that of FIG. 2 and the same references are used to indicate the same or corresponding parts. In this case, however, the deformable member 3 is so orientated that load is applied thereto in a direction transverse to the longitudinal axis of the member 3 rather than along its longitudinal axis. In this case the member 3 is provided with integral bearing pads being separated from the base portion 11 and from the disc 12 respectively by way of respective resilient bodies 4, 4a of sheet rubber or other resilient material.

The bodies 4, 4a and the member 3 are again pre-stressed by shear induced in an annular resilient member 5, of, for example, rubber, which in this embodiment has its upper end provided with an enlarged radially outwardly projecting flange 5c to assist its retention between the member 20 and the disc 12. Screws (not shown) are effective to draw the skirt portion 10 and the member 20 together to produce an axially-directed shear in the member 5 to effect the required pre-stressing of the bodies 4, 4a and the member 3.

We claim:
1. A load-sensitive transducer capable of producing an indication of applied load comprising:
   (a) first and second rigid load receiving bodies across which the load is to be applied;
   (b) a deformable member arranged between the load-receiving bodies so as to suffer stress-induced deformation as a result of load applied across the bodies;
   (c) at least one-load sensing element incorporated in the deformable member and capable of producing an indication of the stress-induced deformation;
   (d) resilient means disposed between at least one of the load receiving bodies and the deformable member, said resilient means being effective to transmit the applied load so as to uniformly distribute it over the cross-section of the deformable body;
   (e) an annular member formed of suitably deformed elastic material for subjecting the resilient means in the deformable member to a pre-stressing in the direction and sense of the applied load and effective to urge said first and second load receiving bodies together, said annular member being subjected to resilient shear deformation axially; and
   (f) two interfitting tubular extensions provided on the respective load-receiving bodies, said annular elastic member being secured between said tubular extensions and means tensioning the respective extensions towards the respective bodies to effect said resilient shear deformation.

References Cited
UNITED STATES PATENTS

| 1,994,388 | 3/1935 | Erichsen | 73—141 |
| 2,536,117 | 1/1951 | Abramson | 73—141 |
| 2,576,417 | 11/1951 | Ruge | 73—141 X |
| 3,045,490 | 7/1962 | Dumas | 73—398 |
| 3,091,961 | 6/1963 | Piell | 73—141 |
| 3,269,175 | 8/1966 | Sprosty | 73—141 |
| 3,277,718 | 10/1966 | Ruge | 73—398 |
| 3,410,135 | 11/1968 | Reynaud | 73—141 |

RICHARD C. QUEISSER, Primary Examiner

J. WHALEN, Assistant Examiner

U.S. Cl. X.R.
73—88.5